US005508482A

United States Patent [19]
Martin et al.

[11] Patent Number: 5,508,482
[45] Date of Patent: Apr. 16, 1996

[54] HORN ACTIVATION AND STEERING WHEEL ASSEMBLY

[75] Inventors: Peter F. Martin, South Ogden, Utah; Michael J. Terilli, Kettering, Ohio

[73] Assignee: General Motors Corporation, Detroit, Mich.

[21] Appl. No.: 320,363

[22] Filed: Oct. 11, 1994

[51] Int. Cl.$^6$ .............................. H01H 9/00; B60R 21/00
[52] U.S. Cl. .................................... 200/61.55; 200/61.54
[58] Field of Search .............................. 200/61.54, 61.57

[56] References Cited

U.S. PATENT DOCUMENTS

| | | | |
|---|---|---|---|
| 4,063,789 | 12/1977 | Kreisl | 339/35 |
| 4,581,508 | 4/1986 | Shanklin et al. | 200/61.54 |
| 4,785,144 | 11/1988 | Fosnaugh et al. | 200/61.55 |
| 4,808,776 | 2/1989 | Niwa et al. | 200/61.55 |
| 4,882,460 | 11/1989 | Mertens | 200/512 |
| 5,036,169 | 7/1991 | Sakane | 200/61.54 |
| 5,198,629 | 3/1993 | Hayashi et al. | 200/61.54 |
| 5,410,114 | 4/1995 | Furuie et al. | 200/61.55 |

Primary Examiner—Kristine L. Kincaid
Assistant Examiner—Michael A. Friedhofer
Attorney, Agent, or Firm—Ernest E. Helms

[57] ABSTRACT

An automotive vehicle horn activation and steering wheel assembly is providing including a column for transmitting a driving torque input into a steering system; a horn contact plate mounted on the steering column electrically isolated therefrom; a wheel fixably mounted on the column, the wheel having a rim connected by a spoke to a hub; a steering wheel mounting plate fixably connected with respect to the column and electrically connected therewith; a module mounted to the steering wheel mounting plate biased to a first position being electrically isolated from the steering wheel mounting plate, the module having a second position electrically contacting the steering wheel mounting plate; and an electrical lead captured between the horn contact plate and the module with a first end contacting the first contact plate and a second end contacting the module, the first end being biased away from the second end by a current conducting spring captured between the first and second ends, the spring being surrounded by a tubular member.

5 Claims, 2 Drawing Sheets

5,508,482

HORN ACTIVATION AND STEERING WHEEL ASSEMBLY

FIELD OF THE INVENTION

The field of the present invention is that of automotive steering wheels and horn activation assemblies. More particularly, the field of the present invention is that of steering wheel and horn activation assemblies which also mount a supplemental inflation restraint (SIR), commonly referred to as an airbag.

BACKGROUND OF THE INVENTION

Steering wheel and horn actuation assemblies have become increasingly complex due to the installation of SIR systems. An example of such an assembly is found in Fosnaugh et al, U.S. Pat. No. 4,785,144, commonly assigned.

SUMMARY OF THE INVENTION

The present invention provides the horn activation and steering wheel assembly which is an alternative to that described above which eliminates a previously required relatively long contact wire that was hard to connect and package within the horn activation and steering wheel assembly.

DESCRIPTION OF THE PREFERRED EMBODIMENT

Figure 1:
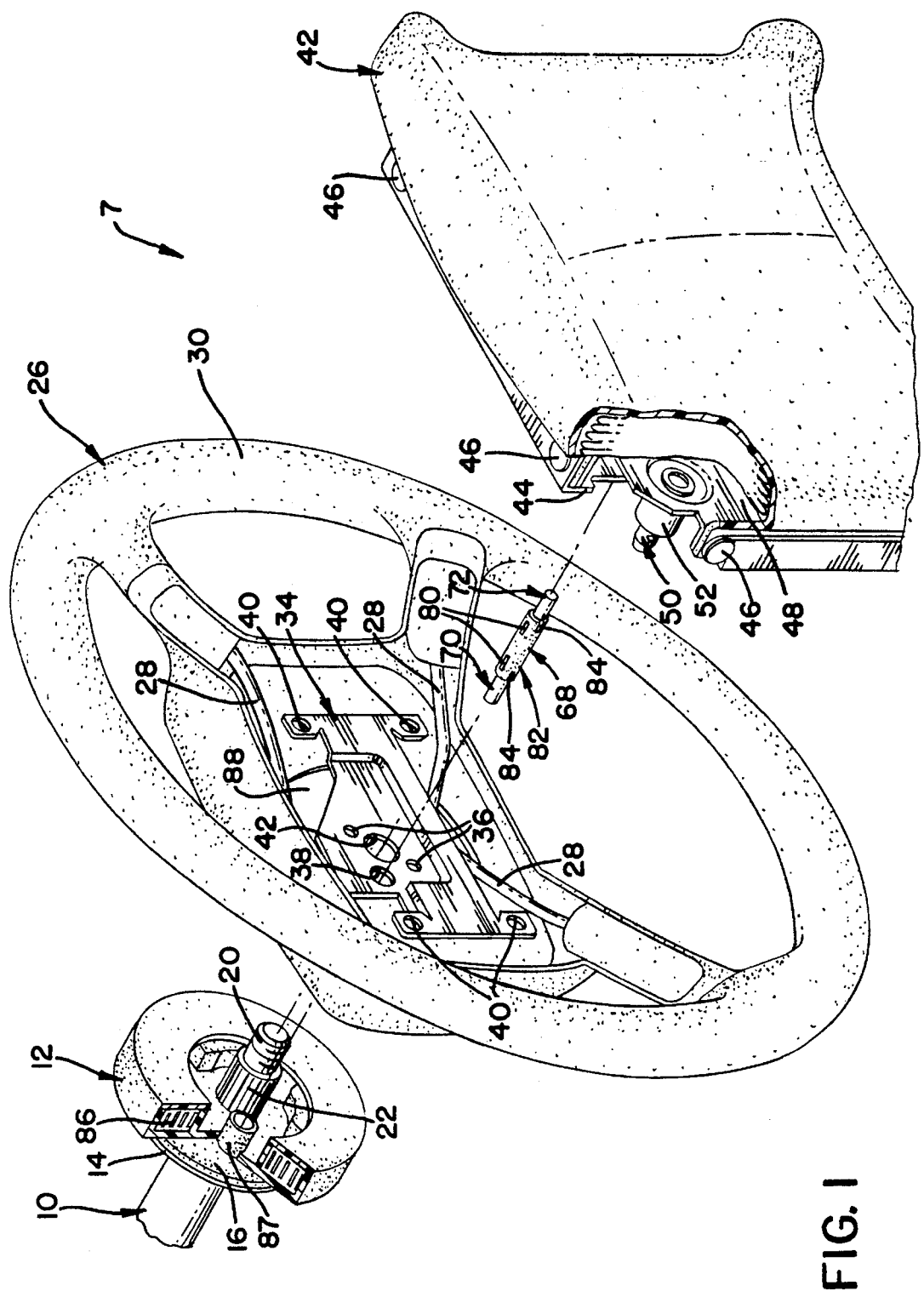
FIG. 1 is an exploded view of a preferred embodiment of the present invention illustrating a module, wireless electric lead, steering wheel and steering column being separated from one another with portions being sectioned for clarity of illustration.
Figure 2:
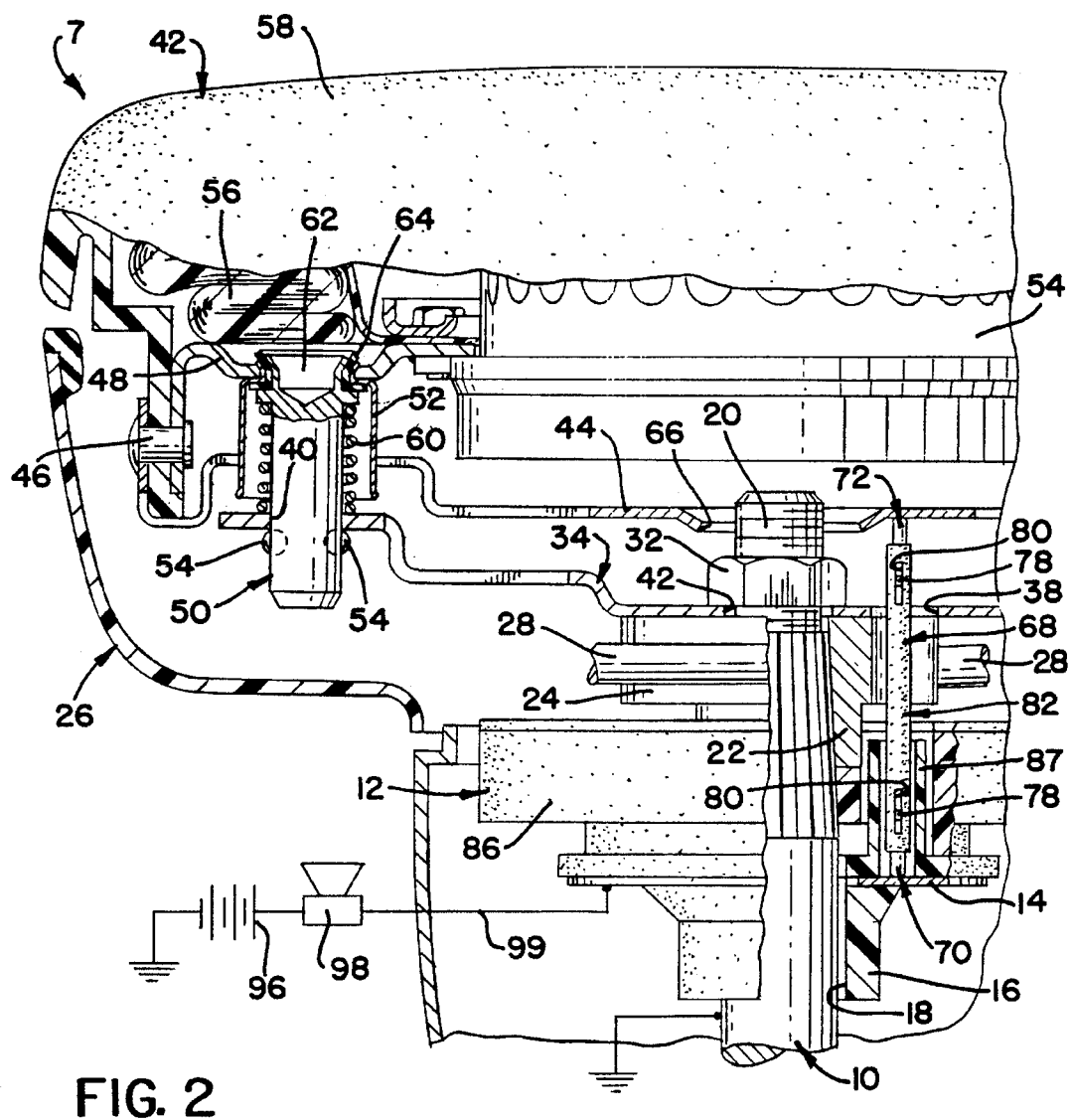
FIG. 2 is a partially sectioned assembly view with portions cut away of the horn activation and steering wheel assembly shown in FIG. 1.
Figure 3:
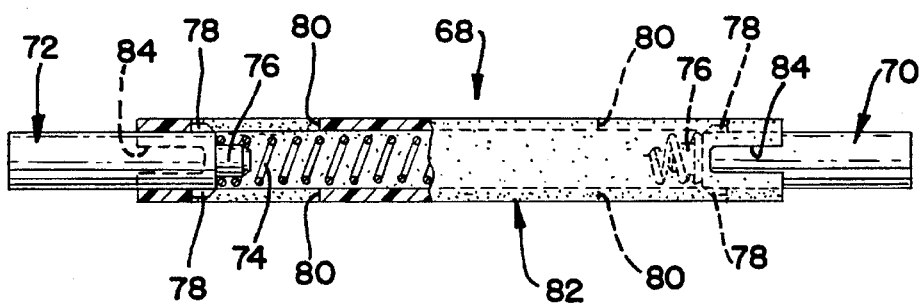
FIG. 3 is an enlarged side elevational view partially sectioned of the wireless electric lead utilized in the horn activation and steering wheel assembly of the present invention.

Referring to FIGS. 1, 2 and 3, the horn activation and steering wheel assembly 7 of the present invention has a steel shaft column 10. The column 10 transmits a torsional input from the driver of the vehicle to a steering system (not shown). The column 10 is also electrically connected to the ground of the electrical system of the vehicle. Mounted on the column 10 is a horn contact plate 12. The horn contact plate has an electrically conducting portion 14 typically fabricated from brass or other highly conductive material. The conducting portion 14 is generally shaped as a flat annular ring and is electrically isolated from the column 10 by an inner mounting polymeric piece 16. Removed from the drawing for clarity of illustration, a coil spring captured between a shoulder (not shown) on the column 10 and an internal flange portion (not shown) in a bore 18 of the inner mounting member urges the horn contact plate 14 toward a threaded end 20 of the column 10.

Fitted over a splined portion 22 of the column is a hub 24 of a steering wheel 26. The hub 24 has weldably connected thereto four spokes 28 which connect with an outer rim 30 of the steering wheel. A nut 32 is threadably engaged onto the column 10 to retain the hub 24 axially upon the column 10.

Also fixably connected to the column 10 by the nut 32 is a steering wheel mounting plate 34. The steering wheel mounting plate 34 has two holes 36 allowing it to be fixably connected to the hub 24 by virtue of cap screws (not shown). Additionally, the steering wheel mounting plate 34 has a larger hole 38 for purposes to be described later and four outer mounting holes 40 along its outer perimeter. Lastly, the steering wheel mounting plate 34 has a central hole 42 allowing for penetration of the threaded end 20 of the column.

The steering wheel mounting plate 34 is electrically connected with the column 10.

Mounted to the steering wheel mounting plate is a module 42. The module 42 includes a module pad retainer 44 which is connected by rivets 46 with a module base plate 48. Fixably connected to the module base plate 48 are four projecting pins 50 having surrounding annular bells 52. Each pin 50 has a ball lock 54. The module base plate 48 also mounts an SIR inflater 54, a fabric air bag 56 and a cover 58.

The module 42 is biased to a first position from the steering wheel mounting plate 34 by springs 60 which push up against the top portion of the bells 52. The springs 60 bottom end (as shown in FIG. 2) presses against the steering wheel mounting plate 34. A top portion 62 of the pin 50 is surrounded by an elastomeric or polymeric grommet 64. Thus, pin 50 and steering wheel mounting plate 34 are electrically isolated from the module base plate 34. The module pad retainer 44 has a central opening 66 which allows for penetration of the threaded end 20 of the column.

To electrically connect the module pad retainer 44 with the conducting portion 14 of the horn contact plate, there is provided a wireless electric lead 68. The wireless electric lead has a first contact 70 which electrically connects with the conducting portion 14 of the horn contact plate and a second lead 72 which makes continual contact with the module pad retainer 44. The ends 72 and 70 are spring biased away from one another by a conducting coil spring 74 fabricated from a tin-coated musical spring steel. The coil spring will typically have a spring rate of approximately two pounds per inch, having 14 coils per inch with a diameter of 0.5 min. Each lead has a spring mounting stud 76 and stud members 78 which are captured in longitudinal slots 80 provided in a polymeric tubular insulator 82 which surrounds the spring 74. The insulator 82 at its opposing end has a slot 84 provided for installing the ends 70 and 72.

Electrical lead 68 is positioned through a slot provided in the hub 24 and penetrates through the inner hole of an SIR exciter coil 86. To align the lead 68, there is provided a tower member 87. As shown, tower member 87 is one piece. However, it may be desired to comprise several different pieces. If desired, the tower 87 may be made to be integral with the insulating portion 16 of the horn contact plate 12. Not shown for clarity of illustration is a steering lock and an associated insulator which typically will abut an end of the horn contact plate toward the column end 20 (with the exception of that portion of the horn contact plate which is contacted by the lead 68).

Referring to FIG. 1, a void 88 is provided to allow a wire (not shown) from the coil 86 to be connected to the inflater 54.

To actuate the horn, the module 42 will be pushed downward against the biasing of spring 60 to cause the bell housing 52 to contact the steering wheel module plate at least at one of its four locations. The above action causes the module 42 to come into its second position wherein it is electrically connected to the steering wheel mounting plate 34.

Current then flows from a source of electric energy 96 to a horn 98 located remotely through a lead wire 99 shown schematically to the conducting portion 14 of the horn contact plate to the first lead 70. Current then flows through the conducting wire 74 to the second lead 72 to the module pad retainer 4, through rivet 46 to module base plate 48 to bell housing 52 to steering wheel mounting plate 34, to the nut 32, column 10 and then to ground, completing the current and thereby activating the horn.

The electric lead 68 eliminates a previous lead wire which connected the horn contact plate conducting portion 14 to the module pad retainer 66. This wire had to be sufficiently long enough to allow it to be attached to the module pad retainer 44 before assembly of the module 42 to the steering wheel mounting plate 34. The length of the wire had to be sufficiently long to be easy to assemble. However, a sufficient length was found to be inconvenient due to the proper placement of the lead wire after the module 42 was assembled to the steering wheel mounting plate 34. If not done correctly, such a wire could cause rattling vibrational noise which could be an irritant to an occupant of the vehicle. Also, the prior wire could short or get cut on a sharp edge of the steering wheel assembly.

To assemble module 42 to the steering wheel mounting plate, the pins 50 are aligned with the holes 40 in the mounting plate and simply pushed inwardly, allowing the ball locks 52 to then pop back out, retaining the module plate to the steering wheel mounting plate 34.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive vehicle horn activation and steering wheel assembly comprising:

a column for transmitting a driving torque input into a steering system;

a horn contact plate mounted on the steering column electrically isolated therefrom;

a wheel fixably mounted on the column, the wheel having a rim connected by a spoke with a hub;

a steering wheel mounting plate fixably connected with respect to the column and electrically connected therewith;

a module mounted to the steering wheel mounting plate biased to a first position being electrically isolated from the steering wheel mounting plate, the module having a second position electrically contacting the steering wheel mounting plate; and an electrical lead captured between the horn contact plate and the module with a first end contacting the horn contact plate and a second end contacting the module, the first end being biased away from the second end by a current conducting spring captured between the first and second ends, the spring being surrounded by a tubular member.

2. An automotive vehicle horn activation and steering wheel assembly as described in claim 1 further including a horn tower having a void generally axially aligned with the column wherein the horn tower aligns the tubular member of the electric lead.

3. An automotive vehicle horn activation and steering wheel assembly as described in claim 1 wherein the tubular member is an electrical insulator.

4. An automotive vehicle horn activation and steering wheel assembly as described in claim 1 wherein the tubular member around the spring also aligns the first and second ends.

5. An automotive vehicle horn activation and steering wheel assembly as described in claim 4 wherein at least one end has a projection which is aligned in a slot of the tubular member which surrounds the spring.

\* \* \* \* \*